(No Model.)  6 Sheets—Sheet 1.
R. T. SMITH.
KEY BOARD PLAYER.
No. 347,134.   Patented Aug. 10, 1886.
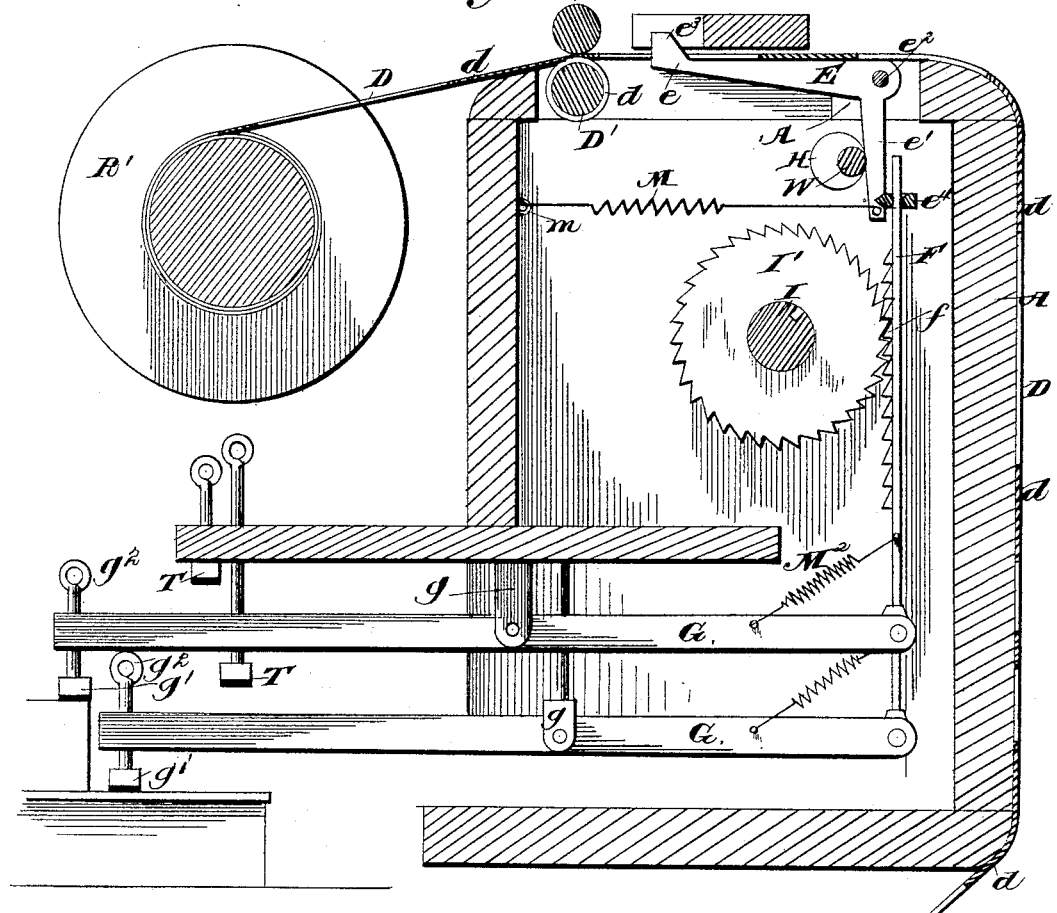
Witnesses:
Chas. S. Hyer
Robert Sewell
Inventor:
Roswell T. Smith
By Charles B. Tilden, Atty

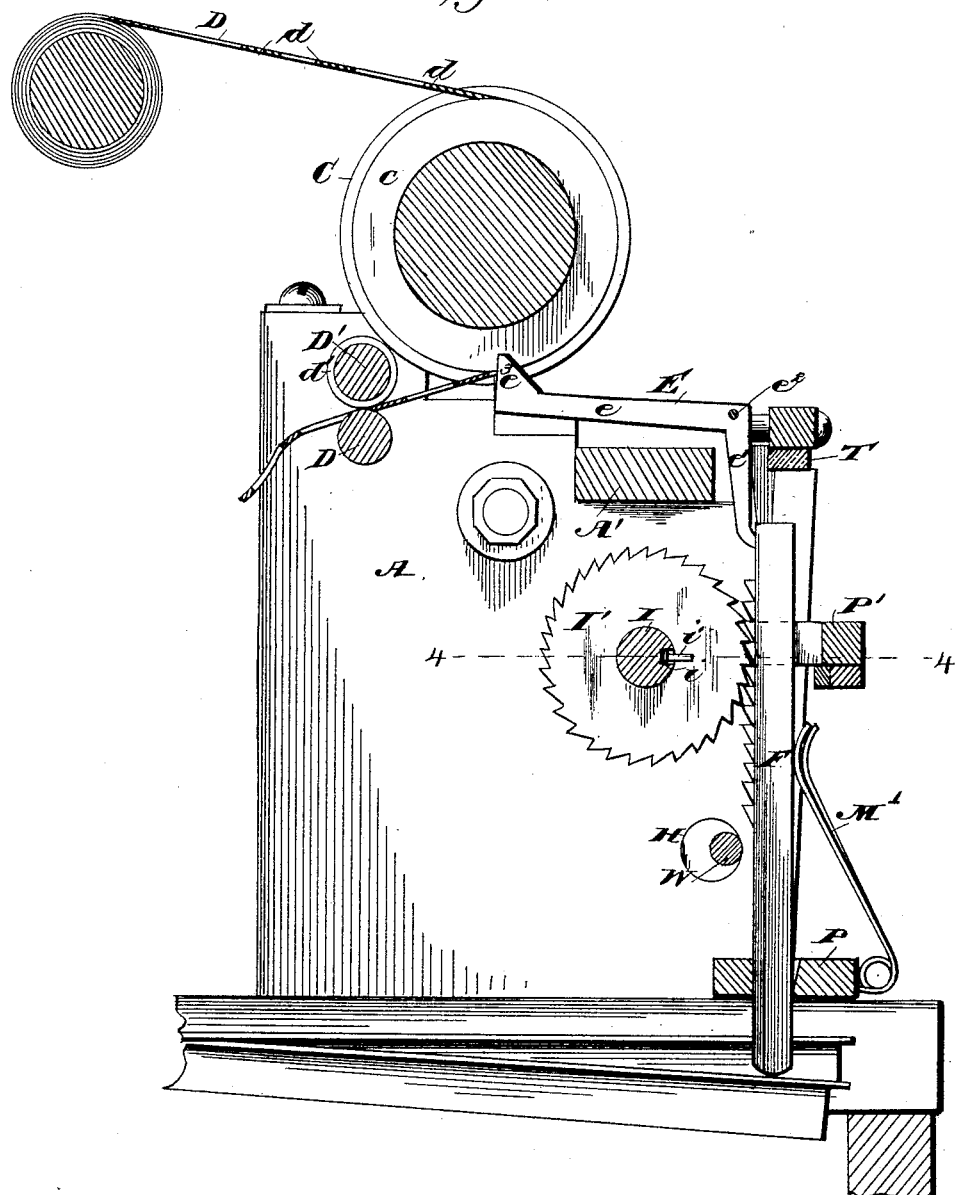

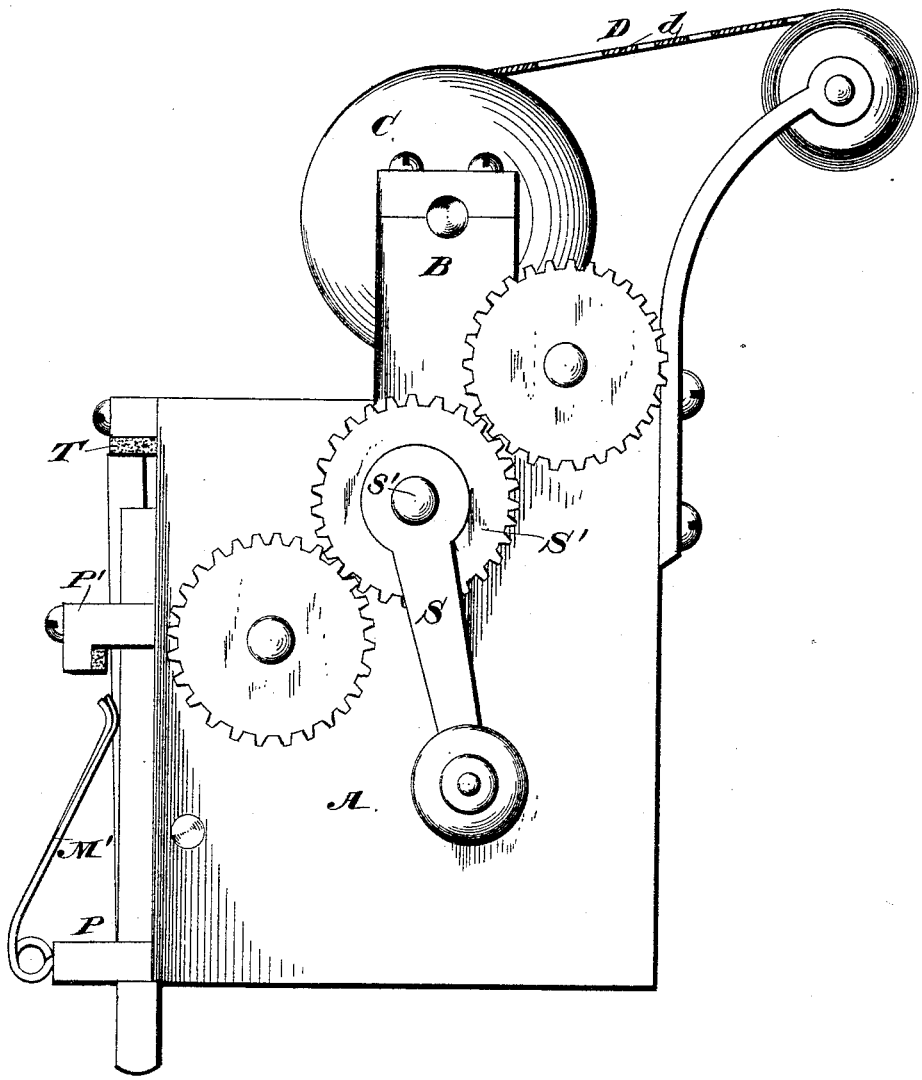

(No Model.)  6 Sheets—Sheet 4.
R. T. SMITH.
KEY BOARD PLAYER.
No. 347,134.  Patented Aug. 10, 1886.
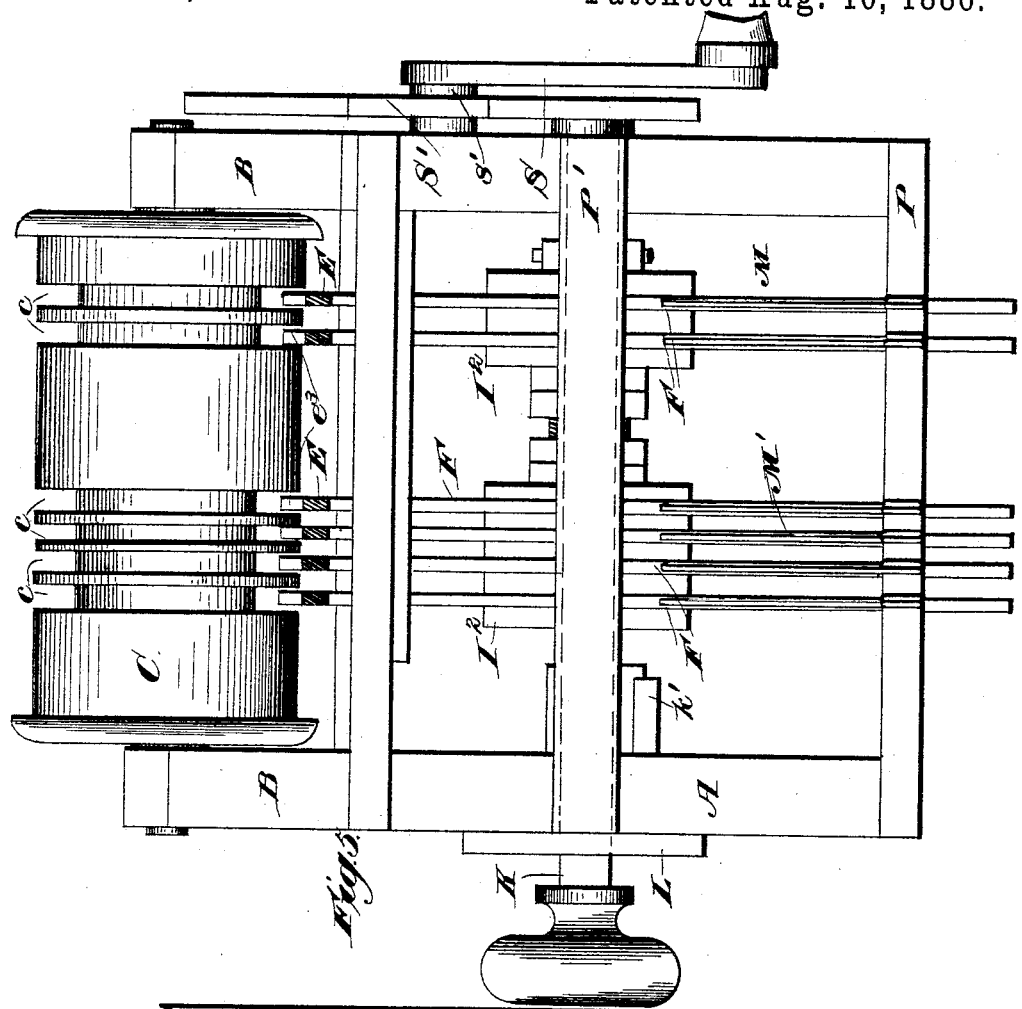
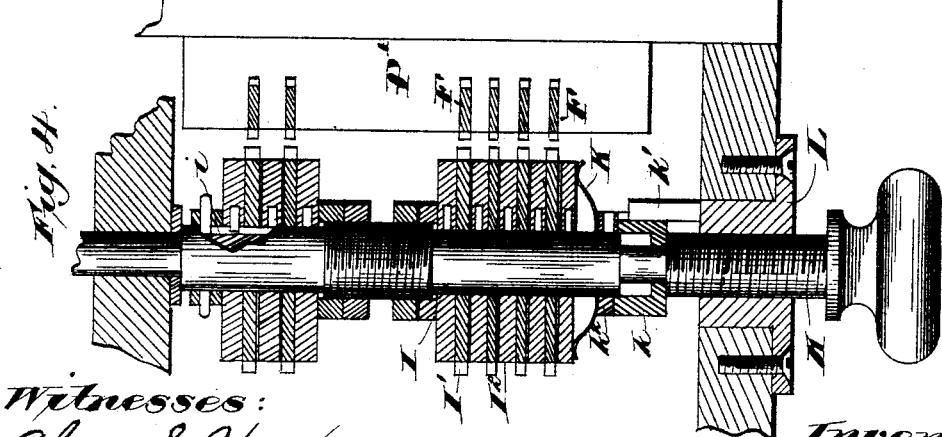
Witnesses:
Chas. S. Hyer
Robert Emmett
Inventor:
Roswell T. Smith
By Charles B. Tilden Atty

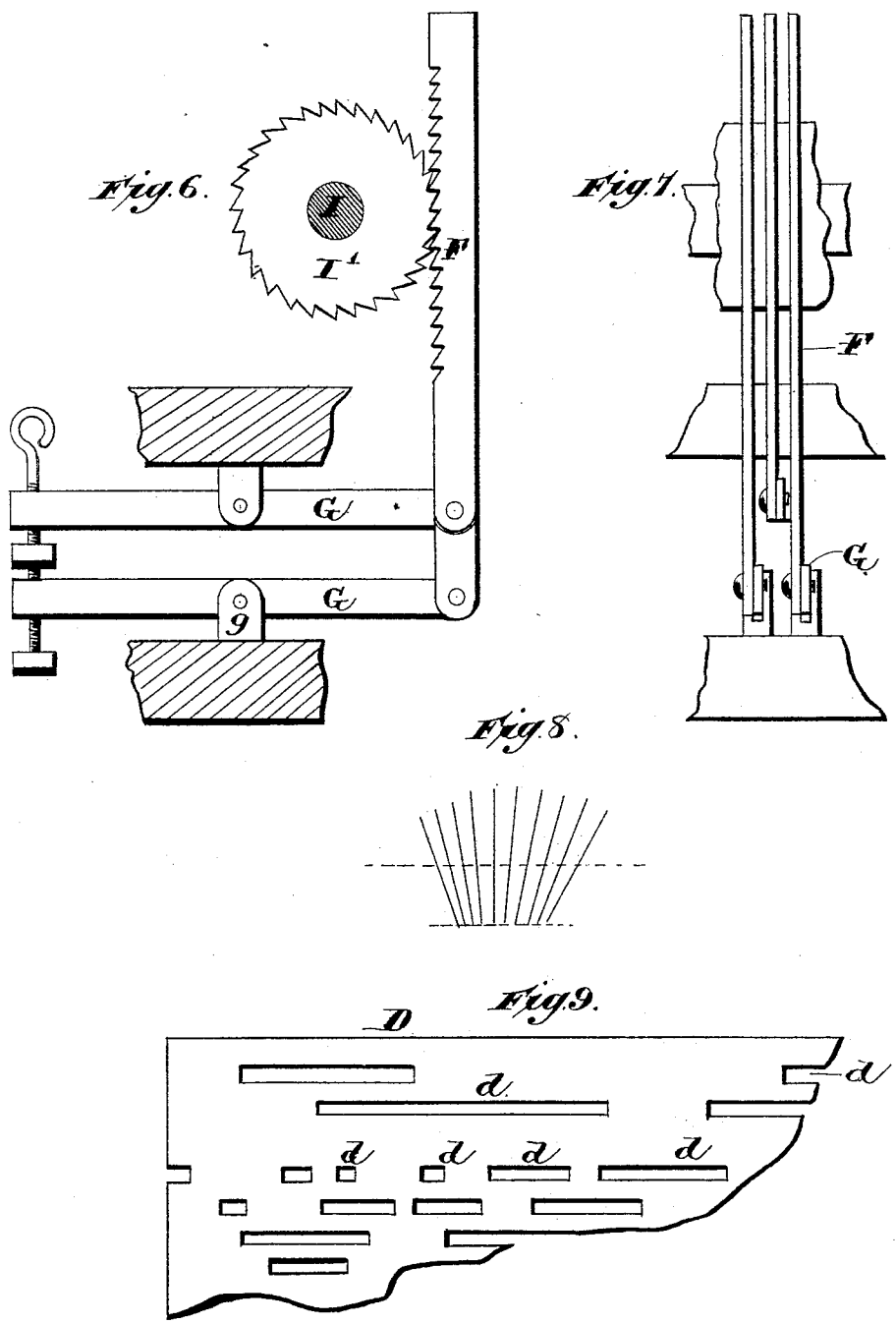

(No Model.)
R. T. SMITH.
KEY BOARD PLAYER.
No. 347,134.
6 Sheets—Sheet 6.
Patented Aug. 10, 1886.
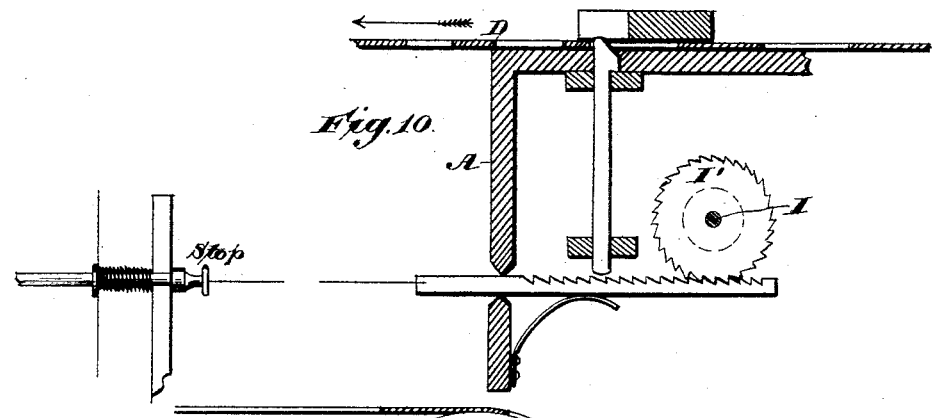
Fig. 10.
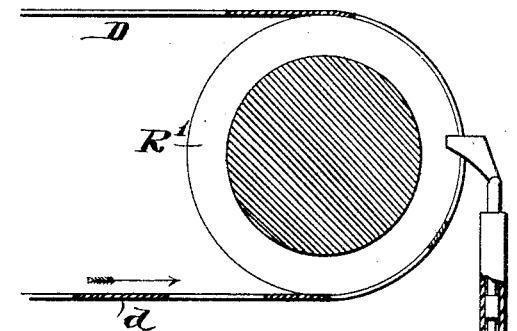
Fig. 11.
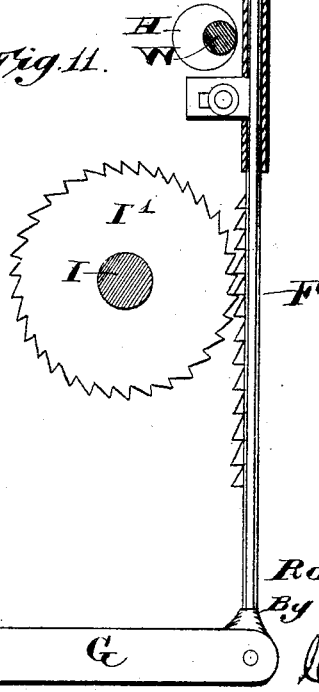
Witnesses:
Chas. S. Hyer
Robert Emmett
Inventor:
Roswell T. Smith
By
Charles B. Tilden
Atty
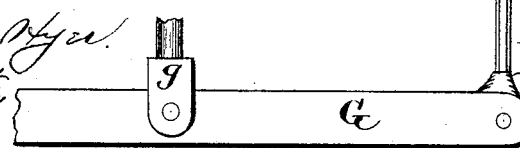

United States Patent Office.

ROSWELL T. SMITH, OF NASHUA, NEW HAMPSHIRE.

KEY-BOARD PLAYER.

SPECIFICATION forming part of Letters Patent No. 347,134, dated August 10, 1886.

Application filed April 23, 1884. Serial No. 129,014. (No model.)

*To all whom it may concern:*

Be it known that I, ROSWELL T. SMITH, a citizen of the United States, residing at Nashua, in the county of Hillsborough and State of New Hampshire, have invented certain new and useful Improvements in Key-Board Players, of which the following is a specification.

My invention relates to automatic apparatus for executing musical compositions upon keyboard instruments; and it consists in novel mechanism for prolonging each note during a period of time which represents its relative value as it is written, said method consisting in holding the key-strikers, after they are operated, by means of frictional contact between the actuating devices.

It also consists in the combination, with a series of key-strikers corresponding in number and arrangement with the white and black keys of the instrument, of a music-sheet having the musical notation represented by perforations formed therein, each opening having a length equivalent to the value of the note it indicates, and having a relative arrangement corresponding with the harmony, and a series of selectors engaging with the music-sheet, by which the strikers, or their actuating-rods, are thrown into and out of engagement with the prime motor by which they are operated, the order of operation being controlled by the perforated music-sheet, which is fed continuously to the selectors, and means, substantially as hereinafter described, whereby the stroke of the key-actuating devices is not only variable in length, according to the requirements of the instrument, but whereby, also, said strikers are held at their full limit of motion by a positive and continuous force during a time representing the relative value of the note.

It also consists in the combination, with the key-strikers, or with their actuating-rods, of a motor-shaft having continuous rotation, and so arranged that each striker, or its actuating-rod, may be brought into operative engagement with the motor rotating upon said shaft in the order indicated by the music-sheet, this operative engagement continuing during a time corresponding with the length of the registering-perforation in the sheet, whereby the key is held, after it is struck, with a positive and continuous force and the note prolonged during a time representing its full value, each motor on the shaft having a frictional connection or bearing, whereby it may slip on the shaft after exerting its full power on the key-strikers.

It also consists in the combination, with the key-strikers, or their actuating-rods, of a motor-shaft having continuous rotation, a series of actuating devices with which said strikers or their rods engage in the order indicated by the perforated music-sheet, and friction devices by which each striker is held down by a positive continuous pressure, exerted by the key-strikers after the key is struck, to prolong each note to its full value without interrupting the rotation of the shaft or interfering with the action of the remaining key-strikers, the said friction devices being used to connect the shaft with the actuating devices, whereby the latter may slip after exerting their full power and hold the key until the note is fully rendered.

It also consists in the combination, with a series of actuating-rods, of a motor-shaft having continuous rotation, a series of motor-disks carried by said shaft, and means, substantially as hereinafter described, for securing such frictional contact as will permit the motor-disks, after they have operated the actuating-rods, to hold said rods at the limit of motion during the time indicated by the music-sheet without interrupting the rotation of the shaft, and without interfering with the action of the remaining rods.

My invention consists, finally, in the several features of construction and combinations of parts hereinafter fully set forth, and specifically pointed out in the claims.

Referring to the drawings, forming part of this application, Figure 1 is a vertical section taken from front to rear of the machine, substantially in a central vertical plane. Fig. 2 is a similar section, showing a modified construction. Fig. 3 is a side elevation of the apparatus shown in Fig. 2. Fig. 4 is a horizontal section taken in the plane 4 4, Fig. 2. Fig. 5 is a front elevation of the modified form of apparatus shown in Figs. 2 and 3. Fig. 6 is a detail section, showing the arrangement of strikers for the white and black keys. Fig.

7 is a front elevation of the parts shown in Fig. 6. Fig. 8 is a diagram illustrating one method of arranging the key-strikers in the form of apparatus shown in Figs. 1 and 6, whereby the bulk of the mechanism is greatly diminished. Fig. 9 is a plan view representing the music-sheet, with a separate series of perforations for controlling the stop mechanism of an organ. Fig. 10 is a detail section illustrating the construction of one form of stop-actuating mechanism adapted to be operated by the music-sheet shown in Fig. 9. Fig. 11 is a detail section showing modifications in the form of the selectors.

A in said drawings represents the frame or casing in which the operative parts have support. It may be made of either wood or metal, and is so constructed that it may rest upon the end blocks of the key-board or manual of the instrument.

B B represent bearings arranged to support a roll, C, having grooves or channels $c$ formed in its periphery at suitable intervals. Over this roll is carried a paper sheet, D, having the musical notation represented thereon by means of openings or perforations $d$, each having a length representing the value of the note for which it stands, and arranged with relation to the other perforations in such a manner as to correctly indicate the harmony. This sheet, in all essential respects, is similar to the music-paper cut by the machines patented to me January 27, 1880, and November 2, 1880. A continuous feed movement is given to the paper sheet by rolls D' D', one or both of which may be covered with rubber, felt, or similar material to give a firm grip upon the paper. The channels $c$ in the roll C are formed at such intervals that when the sheet D is drawn around it the longitudinal lines of perforations $d$ will overlie said channels, for a purpose to be shown hereinafter.

Pivoted to a suitable support, A', is a series of selectors, E, equal in number to the keys which are to be operated. These selectors may, as shown in Fig. 1, be made in the form of a bell-crank; but they may also have other forms, as will be shown hereinafter. When the bell-cranks are used, they are pivoted to their support at the angle formed by the junction of the arms $e$ and $e'$, and arranged in the plane of the channels $c$, each selector having a limited degree of vibration upon its pivot $e^2$. Upon the arm $e$ of each selector is formed a lug or point, $e^3$, having one edge beveled or inclined, and of such length that said points may enter the channels $c$ in the roll C. A spring, M, attached to the arm $e'$ of each selector, normally draws the point $e^3$ into said channel and retains it in that position. The music-sheet being drawn over the roll C and passed between the feed-rolls D', the points $e^3$ will rest upon its imperforate surface, and as the sheet is fed forward the points drop through the perforations into the channels of the roll, and are again withdrawn therefrom by the end of the perforation or note-opening striking the inclined edge of the lug or point. By this means a limited vibration of the arms $e'$ is produced.

Upon the arm $e'$ of each selector E is formed or mounted an eye or loop, $e^4$, through which passes one end of a rod, F, having its lower end pivoted to a key-striker or finger-bar, G, and provided with a rack, $f$, or its equivalent, as hereinafter described. The key-strikers G are pivoted at a point between their ends to lugs $g$, and are so arranged that their free extremities lie just above the keys of the instrument.

For the purpose of economizing space I prefer to arrange these parts in two ranks, one of which I place a little above the other, the lower rank acting upon the white keys and the upper rank on the black keys. For this purpose, also, the upper rank may be made of somewhat greater length than the lower, although this is not essential. Upon the end of each striker-bar I place a striker block, $g'$, having vertical adjustment by means of a set-screw, $g^2$, and having a cushion of felt, rubber, or similar material upon its lower face to deaden its contact with the ivory of the keys. The rods F are arranged in a single rank, and in such a manner that the racks $f$ which lie between their extremities shall be substantially in the same plane. In close contiguity to these racks is placed a transverse shaft, I, having support in the frame A, and extending in front of the series of racks $f$. Upon this shaft are placed ratchet-disks I', loose upon the shaft and having intermediate friction-collars, I$^2$, which are keyed to the shaft in such a manner as to permit a certain degree of longitudinal adjustment. These friction-disks have a thickness equal to the distance between the racks $f$, thereby bringing the whole series of ratchets opposite the corresponding series of racks $f$.

By applying pressure to the friction-disks I$^2$ at one or both ends of the shaft I they may be forced against the ratchet-disks until any required degree of frictional contact is produced. The ratchets being loose upon the shaft, and the friction-disks being keyed to it, it is evident that the rotation of the former depends upon their frictional contact with the disks I$^2$. It will be seen, also, that this force may be so adjusted that when a given resistance is offered to the rotation of any one of the ratchets it will slip upon the shaft I, between its friction-disks, without affecting the operation of the other ratchets or checking the rotation of the shaft.

Referring now to Fig. 1 of the drawings, let it be supposed that the music-sheet D has been fed to the selectors E until the point $e^3$ of one of said selectors has by the tension of its spring M sprung through a note opening or perforation in said sheet representing a "whole" note. This opening will be relatively of considerable length, and the operation of the parts described will be as follows: The moment the point $e^3$ springs through the note-opening the arm $e'$ of the selector draws the rod F, which is connected with the loop $e^4$, toward the shaft I until its rack $f$ meshes with the ratchet I', opposite said rod. The ratchet, being in motion, lifts the rod, thereby actuating the key-striker G, pivoted to it, and operating the key indicated by the note-opening in the music-sheet. As this opening represents a whole note, the key must be held a certain time after it is struck, and to accomplish this the operation is as follows: When the striker-block $g'$ has been depressed sufficiently to fully operate the key of the instrument, the striker-bar G is arrested. This instantly checks the rotation of the ratchet, which slips between the friction-disks I², the pressure of the latter being so adjusted that their friction upon the ratchet-disk will enable it to overcome the spring which raises the key. As the shaft I continues its rotation, therefore, the ratchet will hold the key by a constant and continuous pressure, and thereby prolong the note as long as the point of the selector remains in the note-opening, or, in other words, as long as the rack $f$ remains in mesh with the ratchet I'. As the music-sheet is fed forward, the end of the note-opening impinges upon the inclined edge of the point $e^3$, which is thereby drawn out of said opening. This throws the arm $e'$ away from the shaft and releases the rack $f$ from engagement with the ratchet, when the key of the instrument rises, lifting the striker-block with it, and restoring the rod F to its original position. As each of the rods has independent operation, as have also the ratchets, any musical composition which can be perforated in the music-sheet can be accurately rendered by this apparatus. It will be seen that this result depends upon the peculiar mode of operation of the ratchets, each having a driving power a little greater than the resistance of the key which it acts upon, and adapted to slip upon its bearings when this limit is reached, without decrease of its holding power, and without diminishing the tension of the belt.

The friction-disks I² may be made of wood, hard rubber, metal, or other suitable material. A longitudinal slot, $i$, is formed in the shaft I, and the disks are slipped on the shaft with a spline, $i'$, entering the groove. This construction permits the disks to move upon the shaft in a direction parallel with its axis, to permit any necessary adjustment for varying the clutch of the disks upon the ratchet. This adjustment may be effected in several different ways, one of which is shown in Fig. 4. One end of the shaft I is journaled in a hollow screw, K, tapped through a bearing, L, set in the frame A.

Mounted on the end of the shaft, and bearing against the screw K, is a collar, $k$, which is prevented from turning with the shaft by means of a spline, $k'$, which projects from the bearing L and enters a slot cut in the collar. This collar bears upon a ring, $k^2$, which is keyed to and revolves with the shaft, and between this annulus and the adjacent friction-disk I² is a spring-disk, K'. By turning the screw K the collar $k$ is driven against the ring $k^2$, and this being keyed to the shaft in the same manner as the friction-disks, compresses the spring K', driving the friction-disks more closely against the ratchets, the frictional contact being distributed in equal increments to each member of the series. In this manner the grip of the friction-collars upon the ratchets may be varied to any degree.

Instead of the spring K', I may use a body of leather, felt, or other material.

In the form of apparatus shown in Fig. 1 I employ a series of key-strikers, G, which are operated by the rack-rods F, pivoted to them.

In order to economize space and reduce the mechanism to its smallest bulk, I may arrange the rods F as closely together as is consistent with the discharge of their functions, the key-strikers being arranged in the manner indicated in Fig. 8—that is, radiating or diverging from their pivotal points to bring the extremity of each one over its proper key. By this construction I am able to operate the mechanism by a music-sheet having a width of a few inches.

It is evident that it might be possible to dispense with the key-strikers shown in Fig. 1 and operate the keys by the rods F only. I have shown this modification in Fig. 2 of the drawings. Aside from the omission of the strikers, it involves the following changes only: The rack-rods F, in order to strike the keys of the instrument, must be moved downward, and this requires that the teeth of both the rack and the ratchet shall be cut in a direction opposite to that shown in Fig. 1, and that the ratchet also shall move in an opposite direction. Aside from these changes, the mechanism is substantially similar to that already described.

I have shown in Fig. 1 springs M, connected with the arms $e'$ of the selectors, their function being to draw the rack-rods F into engagement with the ratchets and to draw the points of the selectors against the music-sheet. I may use springs M', as shown in Fig. 2, or I may connect the rods F with their key-strikers G by springs M², as shown in Fig. 1, and this is, on some accounts, the preferable construction.

The striker cushions T (shown in Fig. 1) are arranged between the lugs $g$, upon which the strikers are pivoted, and the free ends of the latter, and in both ranks they are made adjustable toward and from the strikers.

The cushions for the upper and lower ranks hold the striker-blocks against the keys and deaden the noise when the keys rise.

The selecting-levers E may be made in the form shown, or they may be curved, or even straight. When of the latter form, they may be continuations of the rack-rods F, the upper ends of the latter being prolonged for that purpose, as shown in Fig. 11.

It is obvious, also, that a music-sheet may be used having the notes represented by a series of raised points and surfaces, instead of openings. The alterations in the arrangement of mechanism, when such a sheet is used, are too plain to need description.

I also propose to use instead of the ratchets a roll having a series of plain-surfaced rings, with either intermediate friction-collars or some equivalent device for varying the power required to slip the rings between their bearings.

I may dispense with the loop $e^4$, which carries the end of the rod F, and allow the rods to merely rest against the arms $e'$ of the selectors, as shown in Fig. 2. The rods F move in slots formed in a lower transverse bar, P, and an upper bar, P'. In the construction shown in Fig. 1, however, the latter bar may be omitted, as the loop $e^4$ holds and guides the rod. The music-sheet is paid off from a roll, R, which may be mounted in bearings placed beneath the frame A, as shown in Fig. 1. Thence it passes up in front of the machine, over the series of selectors, and to a take-up roll, R'. The mechanism may be operated by a crank, S, mounted upon a stud-bearing, $s'$, and having a gear, S', upon said stud, which meshes with a gear upon the shaft I. The take-up roll may be driven by a belt or by gearing, and the pay-off roll may be arranged as shown in Fig. 2. When the music-sheet has performed its function, it should be rewound upon the pay-off, and for this purpose it is necessary to withdraw the selectors E from engagement with it. I therefore place a cam-shaft, W, just in front of the arms $e'$ of the selectors, and by turning this through one-half of a revolution the cam will throw the whole series of arms away from the shaft I, thereby drawing the points of the selectors out of and away from the paper sheet. The paper may now be wound upon the pay-off roll and used again. If desired, spiral springs may be placed in the interior of each roll, similar to those used in automatic curtain-rollers. The spring of the pay-off being coiled under tension during the feed of the sheet, it will automatically rewind it as it is drawn back by the reverse movement of the feed-rolls. This rewinding of the sheet coils the spring of the take-up roll and prepares it to automatically wind the sheet as the mechanism is operated. If these springs are used, belts and gearing may be dispensed with, so far as these rolls are concerned.

In the apparatus shown in Fig. 2 a cushion may be placed over the upper ends of the rods F to deaden the sound, as said rods rise after they are unmeshed from the ratchets. This apparatus may be used upon any keyed instrument of the class to which pianos, organs, both pipe and reed, and melodeons belong. It may also be used to operate the stops of an organ by means of a separate series of perforations in the music-sheet, or by a separate sheet.

In Fig. 9 I have shown a music-sheet having a series of marginal perforations for controlling these stops, the mechanism controlled by these openings being very similar to that by which the keys are operated. One form of this mechanism is shown in Fig. 10, and is too plain to need explanation.

In Fig. 4 I have shown the stop-actuating ratchets mounted upon the shaft I, with the ratchets that operate the keys. For the purposes of illustration I have shown only four of the latter and two of the former, but as these parts are duplicates further illustration is unnecessary.

By my invention I accomplish two results not heretofore attained in any automatic keyboard apparatus. The motors, whether they are ratchets or the equivalents therefor, move the key-strikers, or their actuating-rods, to their full limit of motion before there is any slip of said motor upon the friction-surface. As I have already stated, this slip may take place at the point where the friction-collars grasp the ratchets, or at the point where the periphery of the motor is tangent with the actuating-rod; but in each case the result is the same, the key being held after it is struck by a constant and unvarying pressure equivalent to the resistance which produces the slip of the motor, the force required to prolong the slip of the motor being equal, or substantially so, to the force which produces it. Moreover, as the frictional slip of the ratchets or their equivalents is caused by stopping the actuating-rods, and as the limit of motion of the latter may be varied by the adjustment of the stop-cushions or the range of action of the keys, it is evident that the apparatus may be used upon a variety of keyed instruments in which the keys may have a different degree of depression. In other words, there is no fixed range of movement to which the actuating-rods and key-strikers are confined, and no fixed point at which the slip of the motor must invariably occur, this point varying according to the distance through which the key must be moved to strike the note. For example, the actuating-rod may upon one instrument move an inch before its action is completed, whereas upon another its proper movement may be one-half an inch only. In each case the slip of the motor will take place the instant the key is depressed to its lowest point.

The stop-cushions are not absolutely essential to the successful operation of my apparatus, since the limit of motion may be produced by the stop of the keys themselves.

I may add that by providing means by which the frictional resistance may be varied I am able to use the apparatus upon instruments having an easy or a hard action without loss of power in the one case, and without danger of a premature slip of the motor in the other.

Heretofore the key-strikers have been operated by a cylinder or a series of wheels having constant revolution, and so arranged that the key-striking levers may have their ends brought against the periphery of the wheels or cylinder, whereby they are held after the stroke is made until said levers are withdrawn longitudinally from their engagement with the face of the cylinder. A revolving pulley has also been used having a belt provided with a thickened portion, and adapted to be drawn against the pulley at intervals, whereby a draft on the belt is produced by which the key-striker may be operated. After the thickened part of the belt has passed off the pulley the parts will not return to their original position until the belt is slackened. In both these forms of construction the wheels or pulleys have rigid connection with their shaft, instead of having a slip on a friction-bearing.

Having thus fully described my invention, what I claim as new, and desire to secure by Letters Patent of the United States, is—

1. In an apparatus for operating key-board instruments, the combination, with a key-striking device, of an actuating device, a motor with which said actuating device engages at suitable intervals, and a frictional clutch or bearing by which said motor is carried, whereby when the limit of movement of the key-striker is reached the motor will slip upon or within its bearing, and thereby hold the key during the time the engagement of the actuating device continues with a constant force or tension equal to the force required to produce the slip of the motor, substantially as specified.

2. In an apparatus for operating key-board instruments, the combination, with a key-striker, of an actuating device, a motor with which said device engages at suitable intervals, a frictional clutch or bearing by which said motor is carried, and means for adjusting said clutch to vary the friction between it and said motor, whereby the key is held after it is depressed to its full limit of movement with a constant unvarying force or tension, and the note thereby prolonged to its full value, the selection and value of each note being determined by a music-sheet having openings of varied length and arrangement, substantially as specified.

3. In an automatic apparatus for operating key-board instruments, the combination, with an actuating-rod, of a motor with which said rod is engaged at intervals, and by which it is moved, and means, substantially as described, for adjusting the friction-bearings of said motor, so that it may slip upon its shaft when the resistance of the rod exceeds the resistance afforded by the friction of said bearings, substantially in the manner and for the purpose described.

4. In an automatic apparatus for playing key-board instruments, the combination, with a series of key-strikers, of a corresponding series of actuating-disks loose upon a continuously-rotating shaft and carried by friction-collars rigid with said shaft, a corresponding series of selectors by which the strikers are engaged with and disengaged from the actuating-disks, a series of springs by which the strikers are normally impelled toward the shaft, a music-sheet constructed in the manner described for governing the action of the selectors, and mechanism for feeding said sheet, substantially in the manner and for the purpose described.

5. In an apparatus for operating a key-board instrument, the combination, with a series of actuating-rods pivoted upon a corresponding series of key-strikers, of a series of spring-actuated selectors fulcrumed between their ends and having one end loosely connected with said actuating-rods, a perforated music-sheet with which the beveled points upon the other ends of said selectors engage, and a motor arranged in front of each actuating-rod, with which said rod is engaged by the point of the selector falling through an opening in the music-sheet, substantially as specified.

6. In an automatic key-board player, the combination, with a shaft having a series of ratchets loosely mounted thereon, of a series of friction collars or disks intermediate of said ratchets and keyed to the shaft, and means for adjusting the pressure of said collars upon the ratchets, substantially as and for the purpose described.

7. In an automatic key-board player, the combination, with a shaft having a longitudinal channel cut in its periphery, of a series of ratchets loose upon said shaft, a series of intermediate collars having splines which engage with said channel, and a set-screw by which the entire series of collars and ratchets may be forced together and their frictional contact increased or diminished, substantially as and for the purpose described.

8. In an automatic key-board player, the combination, with an actuating-rod, of a motor with which said rod is engaged at proper intervals, and a friction-clutch carrying the motor by which said rod is operated, and by the resistance of which it is held after its limit of movement is reached, the motor acting upon said rod at all times, when the two are in engagement, with a constant and unvarying force, substantially as and for the purpose described.

In testimony whereof I have signed my name to this specification in the presence of two subscribing witnesses.

ROSWELL T. SMITH.

Witnesses:
CLARA L. LOVELAND,
C. E. P. SMITH.